US010018702B2

United States Patent
Schräbler et al.

(10) Patent No.: US 10,018,702 B2
(45) Date of Patent: Jul. 10, 2018

(54) METHOD AND COMMUNICATION APPARATUS FOR VALIDATING A DATA CONTENT IN A WIRELESSLY RECEIVED COMMUNICATION SIGNAL, AND USE OF THE COMMUNICATION APPARATUS

(71) Applicant: Continental Teves AG & Co. oHG, Frankfurt (DE)

(72) Inventors: Sighard Schräbler, Karben (DE); Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 295 days.

(21) Appl. No.: 14/914,872

(22) PCT Filed: Sep. 5, 2014

(86) PCT No.: PCT/EP2014/068989
§ 371 (c)(1),
(2) Date: Feb. 26, 2016

(87) PCT Pub. No.: WO2015/032920
PCT Pub. Date: Mar. 12, 2015

(65) Prior Publication Data
US 2016/0209489 A1 Jul. 21, 2016

(30) Foreign Application Priority Data
Sep. 6, 2013 (DE) .................. 10 2013 217 869

(51) Int. Cl.
*G01S 3/48* (2006.01)
*G01S 5/00* (2006.01)
(Continued)

(52) U.S. Cl.
CPC .............. *G01S 3/48* (2013.01); *G01S 5/0072* (2013.01); *G01S 5/12* (2013.01); *H04W 12/06* (2013.01); *H04W 4/025* (2013.01); *H04W 4/046* (2013.01)

(58) Field of Classification Search
CPC . G01S 3/02; G01S 5/12; G01S 5/0072; G01S 3/48; G01S 5/02; G01S 5/021; H04W 64/00; H04W 12/06
(Continued)

(56) References Cited

U.S. PATENT DOCUMENTS 6,246,376 B1    6/2001   Bork
6,377,169 B1 *  4/2002   Yanagisawa ......... G08B 25/001
                                                340/3.1

(Continued)

FOREIGN PATENT DOCUMENTS

DE    102007058192    6/2009
DE    102010029744    2/2011
(Continued)

OTHER PUBLICATIONS

Larry B Kuechle, Dec. 31, 2011, Advanced Telemetry Systems, Inc., p. 2-3, Figure 2.*
(Continued)

*Primary Examiner* — Harry K Liu
(74) *Attorney, Agent, or Firm* — RatnerPrestia

(57) ABSTRACT

A method for validating data content in a wirelessly received communication signal, wherein the data content includes at least one position statement for a transmission module sending the communication signal, wherein the communication signal is received by a reception module having at least two antennas, wherein the communication signal is used to determine a direction from the reception module to the transmission module and wherein the determined direc-
(Continued)

tion is used to validate the position statement. The direction is determined from a phrase difference in the communication signal at the at least two antennas. The invention further relates to a corresponding communication apparatus and to a use for the communication apparatus.

15 Claims, 2 Drawing Sheets

(51) Int. Cl.
    *G01S 5/12*     (2006.01)
    *H04W 12/06*     (2009.01)
    *H04W 4/02*     (2018.01)
    *H04W 4/04*     (2009.01)

(58) Field of Classification Search
    USPC .......................................................... 342/457
    See application file for complete search history.

(56) References Cited

U.S. PATENT DOCUMENTS

| | | | | |
|---|---|---|---|---|
| 7,764,224 | B1 * | 7/2010 | Anderson | G01S 19/215 342/357.27 |
| 8,130,142 | B2 * | 3/2012 | Zietz | G01S 19/35 342/357.36 |
| 8,159,395 | B2 | 4/2012 | Fukada et al. | |
| 8,471,775 | B2 | 6/2013 | Nakabayashi et al. | |
| 8,576,112 | B2 * | 11/2013 | Garrec | G01S 13/913 342/27 |
| 8,923,147 | B2 * | 12/2014 | Krishnaswamy | G08G 1/093 370/252 |
| 9,188,979 | B2 * | 11/2015 | Torti | G05D 1/0011 |
| 9,229,111 | B2 * | 1/2016 | Monnerat | G01S 19/42 |
| 9,234,758 | B2 * | 1/2016 | Friend | G01B 11/00 |
| 9,285,453 | B2 * | 3/2016 | Schantz | G01S 5/0252 |
| 9,625,562 | B2 * | 4/2017 | Holte | G01S 3/48 |
| 9,820,113 | B2 * | 11/2017 | Klang | H04W 4/12 |
| 2009/0002165 | A1 | 1/2009 | Tuttle | |
| 2009/0179799 | A1 | 7/2009 | Kawasaki | |
| 2012/0053888 | A1 | 3/2012 | Stahlin | |
| 2012/0139761 | A1 | 6/2012 | Stahlin | |
| 2013/0165146 | A1 | 6/2013 | Stahlins | |
| 2014/0350792 | A1 | 11/2014 | Schrabler | |
| 2014/0350793 | A1 | 11/2014 | Schrabler | |

FOREIGN PATENT DOCUMENTS

| | | |
|---|---|---|
| DE | 102011079052 | 3/2012 |
| DE | 102012221260 | 5/2013 |
| DE | 102012221264 | 5/2013 |
| JP | H10148670 A | 6/1998 |
| JP | 2006072725 A | 3/2006 |
| JP | 2008233017 A | 10/2008 |
| JP | 2008310728 A | 12/2008 |
| JP | 2010160069 A | 7/2010 |
| JP | 2010220008 A | 9/2010 |
| JP | 2010250667 A | 11/2010 |
| JP | 2011097352 A | 5/2011 |
| JP | 2011211336 A | 10/2011 |
| JP | 2012211844 A | 11/2012 |
| JP | 2013096828 A | 5/2013 |
| JP | 2013113819 A | 6/2013 |
| WO | 2010043658 | 4/2010 |
| WO | 2010139806 | 12/2010 |
| WO | 2012007491 | 1/2012 |

OTHER PUBLICATIONS

German Search Report for German Application No. 10 2013 217 869.7 dated Nov. 19, 2013, including partial translation.
International Search Report for International Application No. PCT/EP2014/068989 dated Dec. 17, 2014.
Written Opinion of the International Searching Authority for International Application No. PCT/EP2014/068989 dated Dec. 17, 2014.
Notification of Reasons for Refusal for Japanese Application No. 2016-539557, dated Mar. 27, 2017, including English translation, 11 pages.

* cited by examiner

METHOD AND COMMUNICATION APPARATUS FOR VALIDATING A DATA CONTENT IN A WIRELESSLY RECEIVED COMMUNICATION SIGNAL, AND USE OF THE COMMUNICATION APPARATUS

CROSS REFERENCE TO RELATED APPLICATIONS

This application is the U.S. National Phase application of PCT International Application No. PCT/EP2014/068989, filed Sep. 5, 2014, which claims priority to German Patent Application No. 10 2013 217 869.7, filed Sep. 6, 2013, the contents of such applications being incorporated by reference herein.

FIELD OF THE INVENTION

The invention relates to a method for validating a data content in a wirelessly received communication signal, a communication apparatus for validating a data content in a wirelessly received communication signal and a use of the communication apparatus.

BACKGROUND OF THE INVENTION

In the prior art, different types of driver assistance systems are known which essentially share the common feature that they serve to ease the burden on the driver in traffic events. Driver assistance systems of this type are often also capable of carrying out measures which extend beyond a pure comfort effect and which, in particular, avert hazards. Examples of these include such things as situation-related warning outputs to the driver or even interventions in the vehicle control. The necessary information acquisition is increasingly based on vehicle-to-X communication which, however, relies on processing-intensive encoding and decoding methods in order to ensure the necessary data security and therefore protect against maliciously manipulated vehicle-to-X messages. It is also known in the prior art for the content of a received vehicle-to-X message to be validated by means of environment sensors, so that the comparatively processing-intensive decoding of the corresponding vehicle-to-X message can be dispensed with.

In this context, DE 10 2007 058 192 A1, which is incorporated by reference describes a central control device for a plurality of assistance systems provided in a motor vehicle which are at least partially equipped with environment sensors, wherein, according to DE 10 2007 058 192 A1, a telematics system is also understood as an environment sensor. The central control device is connected at data level to the individual assistance systems and checks the plausibility of the information from individual environment sensors by means of the information from other environment sensors. For example, the image information from a camera can confirm the distance measurement of a radar sensor. Individual sensor information can thus be confirmed and is present in redundant form.

DE 10 2012 221 260 A1, which is incorporated by reference discloses a method for determining the position of objects in road traffic. A transceiver initially transmits wireless communication signals. These signals are at least partially reflected in their propagation area on the objects located there and are finally received once more by the transceiver as reflection signals. The transceiver then determines the distance and the direction of the object in relation to the transceiver from different phase information of the reflection signals. The distance is determined from the phase difference in two reflection signals transmitted and received once more on different frequencies. The direction, on the other hand, is determined from the phase difference in a reflection signal which is received by means of two spatially slightly offset antenna elements. In the latter case, the phase difference is the phase difference that is generated by the spacing of the two antenna elements. According to DE 10 2012 221 260 A1, it is not necessary for the communication signals and the reflection signals to be transmitted and received by the same transceiver. Instead, it is also possible for a first transceiver to transmit the communication signals and a second transceiver to receive the reflection signals.

A method and a system for validating a vehicle-to-X message are known from DE 10 2011 079 052 A1, which is incorporated by reference. A wirelessly transmitted vehicle-to-X message is received by an antenna arrangement having at least two antenna elements, wherein the electromagnetic field strength of the vehicle-to-X message is acquired by the antenna elements with different power densities due to the different, direction-dependent receive characteristics of the antenna elements. The receiver determines a relative position of the transmitter in relation to the receiver from the ratio of the different power densities in the antenna elements. The vehicle-to-X message furthermore contains an absolute position of the transmitter based on GPS data from which the receiver of the vehicle-to-X message calculates a further relative position of the transmitter in relation to the receiver via its own absolute position. The received vehicle-to-X message can then be validated by means of a comparison of the two relative positions if the two positions match one another, or can be rejected if the positions differ from one another.

However, the methods, apparatuses and systems known in the prior art are disadvantageous because they always require additional sensor devices or measuring devices, such as a multi-element directional antenna, in order to validate a received communication signal, or must perform a processing-intensive decoding, which in turn requires correspondingly powerful and therefore expensive processing modules.

SUMMARY OF THE INVENTION

An aspect of the invention therefore proposes a method which overcomes the prevailing disadvantages.

An aspect of the invention relates to a method for validating a data content in a wirelessly received communication signal, wherein the data content comprises at least one position indication of a transmit module transmitting the communication signal, wherein the communication signal is received by a receive module having at least two antennas, wherein a direction from the receive module to the transmit module is determined by means of the communication signal and wherein the determined direction is used to validate the position indication. The method according to the invention is characterized in that the direction is determined from a phase difference in the communication signal on the at least two antennas.

Through the formation of the phase difference in the communication signal on the at least two antennas, information independent from the data content of the communication signal is used to determine the direction from the receive module to the transmit module, i.e. the direction from which the communication signal arrives at the receive module. The advantage here is that the described phase difference is characterized exclusively by the direction from the transmit module to the alignment of the antennas of the receive module. In contrast to the position indication comprised by the data content of the communication signal, the direction determined from the phase difference cannot therefore be manipulated by the transmitter or, where relevant, by intermediate stations. A reliable parameter is therefore available for validating the position indication comprised by the data content of the communication signal.

In the method according to an aspect of the invention, the direction from the receive module to the transmit module is preferably determined from the phase difference according to the interferometer method. It should be noted here that the spacing of the at least two antennas must not be greater than the half wavelength of the communication signals, since ambiguities in the direction information otherwise occur. Since the communication signal runs from the transmit module to the receive module and the receive module receives the communication signal with at least two antennas, the communication signal is acquired by at least two antennas, normally at a slightly different angle. This different angle is responsible for the fact that the distances traveled by the communication signal from the transmit module to the at least two antennas of the receive module are not exactly identical. This in turn results in a phase difference in the communication signal on the at least two antennas. Since the spacing of the antenna elements is furthermore known, an angle which indicates the direction from the receive module to the transmit module can be determined from the phase difference if the wavelength of the communication signal is known. If two antennas are used, the direction from the receive module to the transmit module can be unambiguously determined through 180°.

In particular, it is preferred that the communication signals are received by means of four antennas of the receive module, wherein, in particular, the phase difference on the four antennas is determined. This allows the determination of the direction to be unambiguously carried out through 360°. For example, the phase difference can be considered on a first pair of antennas as the sinusoidal component, and the phase difference on a second pair of antennas as the cosinusoidal component of a complete signal. An angle which unambiguously describes the direction to the object through 360° is then obtained by applying an $\arctan^2$ function to the sinusoidal component and the cosinusoidal component.

The position indication preferably comprises both a direction from the receive module to the transmit module and a distance from the receive module to the transmit module. The position indication can be designed, e.g. in the form of GPS coordinates, for this purpose, wherein the receive module or a position determination module assigned to the receive module determines the direction and the distance from its own position and the position indication. Its own position can similarly be determined by means of GPS, but also by means of any other global navigation satellite system. Its own position can also be determined by means of map matching.

A further advantage of the use of the phase difference for validation is that the method according to the invention is thereby comparatively more robust and less susceptible to interference than methods known from the prior art which use information relating to the received power of the communication signal, since the phase difference, unlike power information, cannot easily be affected. For example, only a slight shadowing of the transmit module or the receive module is already sufficient to render the communication signals acquirable in a significantly weakened form only. The phase difference, however, remains unaffected by shadowing of this type.

An aspect of the invention thus describes a method which, with comparatively simple means, enables a determination of the direction from the receive module to the transmit module at an angle of 360° around the receive module. This maximum position determination angle is derived from the receiving angle of the communication signals, which is normally 360°. The method according to the invention thus offers a significantly greater position determination angle than, for example, radar sensors or camera sensors used for similar purposes.

A further advantage manifests itself insofar as the processing power to be reserved according to the prior art for conventional encryption methods and encoding methods for encrypting and encoding the data content of the communication signal can be substantially reduced, since the method according to the invention enables a validation of at least the position indication by means of a comparatively simple comparison of the determined direction with the position indication.

The transmit module and the receive module are advantageously assigned to a vehicle-to-X communication device. The transmit module and the receive module appropriately transmit and receive communication signals by means of at least one of the following communication types:

WLAN communication, in particular according to IEEE 802.11p,
Wi-Fi Direct communication,
ISM communication (Industrial, Scientific, Medical Band), in particular via a radio-link-enabled locking device,
Bluetooth communication,
ZigBee communication,
UWB communication (Ultra Wide Band),
WiMax communication (Worldwide Interoperability for Microwave Access),
remote keyless entry communication,
mobile communication, in particular GSM, GPRS, EDGE,
UMTS communication,
LTE communication, and
infrared communication.

The listed communication types offer different advantages and disadvantages in terms of their communication characteristics, depending on the type, wavelength and data protocol that is used. WLAN connections enable e.g. a high data transmission rate and a fast connection set-up. ISM connections, on the other hand, offer only a low data transmission rate, but are outstandingly suitable for data transmission around visibility obstacles. Infrared connections in turn similarly offer a low data transmission rate. Finally, mobile connections are not adversely affected by visibility obstacles and offer a good data transmission rate. However, the connection set-up of mobile connections is, on the other hand, comparatively slow. The mobile-based communication means are preferably assigned to an automatic emergency call module.

Since vehicle-to-X communication devices are in any case normally provided with at least two antennas for reasons of reliability and security, the additional cost incurred in providing a second antenna can advantageously be spared.

It is appropriately provided that the phase difference is determined by means of mixing, wherein the communication signal received on the first of the at least two antennas is mixed with the communication signal received on the second of the at least two antennas. The mixing is preferably carried out by means of complex-conjugate multiplication and/or by means of cross-multiplication. The mixing of two signals produces sidebands with the spacing of the phase difference adjacent to the frequency of the communication signal(s). Through the complex-conjugate multiplication or the cross-multiplication, this step can also be carried out arithmetically at complex-number level. A reliable determination of the phase difference is thus enabled in a simple manner.

It is furthermore preferable for the communication signal to be acquired temporally in parallel by the receive module by means of the at least two antennas. Due to the temporally parallel, i.e. simultaneous, acquisition of the communication signal on the at least two antennas, a particularly accurate comparison of the phase respectively present on the at least two antennas, and therefore a particularly accurate determination of the phase difference, are possible. The opposite to the temporally parallel acquisition would be an alternating, i.e. temporally deferred, acquisition of the communication signal on the at least two antennas.

It is furthermore provided that a first distance from the receive module to the transmit module is determined by means of an acquired received power of the communication signal on at least one of the at least two antennas and that the first distance is used to validate the position indication. Since the received power weakens per area unit by the square of the distance traveled by the communication signal, the receive module can infer the distance to the transmit module via the received power by means of the aforementioned relationship. This represents additional information which can be used to validate the position indication. Since it must be assumed that the communication signal has been additionally weakened in its received power on reaching the receive module due to obstacles or shadowing, the acquired received power is preferably compared with a maximum possible received power in order to validate the position indication. The maximum possible received power is derived, in particular, from the distance contained in the position indication and the received power decreasing quadratically over this distance, wherein it is assumed that the communication signal undergoes no weakening of the received power due to shadowing.

It is appropriately provided that a Doppler frequency of the communication signal is determined. The Doppler frequency contains additional information which similarly cannot be manipulated, relating to the distance and the direction to the transmit module. Along with the distance and the direction to the transmit module, a speed of the transmit module can therefore also be determined.

In particular, it is appropriate for the transmit units to be subdivided into mobile transmit units and stationary transmit units by means of the Doppler frequency. Since the determination of the exact Doppler frequency and therefore the determination of the exact speed of the transmit module can be implemented exactly with comparative difficulty and only at high cost due to random frequency drifts of the oscillators of the transmit module and of the receive module, the advantage is therefore provided that an exact determination of the speed of the transmit module is dispensed with from the outset and therefore an exact determination of the Doppler frequency is totally unnecessary. The rough subdivision into mobile transmit units and stationary transmit units can, on the other hand, be performed with comparative ease.

It is quite particularly appropriate that the data content furthermore comprises a speed indication of the transmit module transmitting the communication signal, wherein the subdivision of the transmit units is used to validate the speed indication. This offers the advantage that, via the speed indication comprised by the data content and via the subdivision of the transmit units produced from the Doppler frequency, a further parameter is available to validate the data content of the communication signal.

It is furthermore provided that communication signals are transmitted and/or received temporally in parallel on at least two frequencies by means of the at least one of the at least two antennas. The data contents of received communication signals are preferably also evaluated. This initially offers the advantage of the fastest and most efficient possible communication between the receive module and the transmit module, since it is possible to transmit simultaneously on a plurality of frequencies, whereby more transmission bandwidth is accordingly available. Furthermore, it is thus possible to use a different frequency or a different channel for the transmission of the communication signal if the currently used frequency or the currently used channel does not offer the necessary bandwidth, e.g. due to excessive usage by other transmit units. The temporally parallel transmission and reception of communication signals can be implemented in a simple manner through corresponding design of the receive module and the transmit module, e.g. by means of a circulator. A temporally parallel evaluation of the data contents of the received communication signals is thus also enabled.

In particular, it is provided that a second distance from the receive module to the transmit module is determined from a phase difference in the communication signals on the at least two frequencies on the at least one of the at least two antennas. The use of two different frequencies enables a determination of the second distance, i.e. an additional determination of the distance from the receive module to the transmit module, via the Vernier method. The distance is inferred from the phase difference in the communication signals on the at least two frequencies which change differently due to the different wavelength or frequency of the transmitted communication signals with the distance traveled. Since the phase difference begins to be repeated as from a specific distance from the transmit module, a determination of the distance is no longer unambiguous as from a specific distance limit value, since a specific phase difference may correspond not only to a specific distance but also to any given multiple of this distance. It should be emphasized that the phase difference that is used for the Vernier method is the phase difference in two different wavelengths on the same antenna, unlike the phase difference that is used in the interferometer method. In the interferometer method, the phase difference in the same wavelength on two different antennas is used.

It is quite particularly preferably provided that the at least two frequencies are two different communication channels of a common communication means. It is thereby normally ensured that the frequency spacing of the two frequencies is not too great and furthermore a uniform evaluation and processing by the same receive module is guaranteed.

WLAN according to IEEE 802.11p is particularly preferably suitable in this connection, since communication takes place here via two channels, each having a 10 MHz bandwidth, which are separated by a third, unused channel similarly having a 10 MHz bandwidth.

It is advantageous that the entire data content is validated if the data content does not conflict with at least the determined direction and/or at least the determined first distance and/or at least the determined second distance and/or at least the subdivision. All of these parameters allow a reliable checking of the parameters corresponding to them and comprised by the data content. Since it can be assumed that the complete data content of the communication signal can be trusted if one or more of the aforementioned parameters comprised by the data content does not conflict with or even matches the determined variables corresponding to them, the data content can thus be validated. In particular, the entire data content is validated only if it not only does not conflict with one of the aforementioned parameters, but also if it does not conflict with all of the parameters used for the validation. Otherwise, it is rejected as unreliable and is not further evaluated or is not electronically processed.

It is preferable that the transmit module and the receive module are assigned to different road users. The method can thus be used advantageously in road traffic in the communication of different road users. Since the reliability of the received communication signals is of particular importance specifically in road traffic, this offers a great advantage. Road users within the meaning of the invention are, in particular, all types of motor vehicles, such as trucks, automobiles, and motorcycles, but also cyclists and pedestrians.

It is furthermore appropriate that the data content triggers a vehicle-safety-critical intervention in a vehicle control of a vehicle to which the receive module is assigned. This offers the advantage that the communication signal or its data content can be used in the vehicle to which the receive module is assigned for accident avoidance or accident reduction.

An aspect of the invention furthermore relates to a communication apparatus for validating a data content in a wirelessly received communication signal, comprising at least a transmit module, a receive module, two antennas, data-reading means, direction determination means and validation means, wherein the two antennas are assigned similarly to both the transmit module and the receive module, wherein the communication apparatus is designed to transmit communication signals by means of the transmit module and to receive communication signals by means of the receive module, wherein the communication apparatus is designed to read, by means of the data-reading means, a position indication comprised by the data content, wherein the communication apparatus is designed to determine, by means of the direction determination means, a direction from which the communication signals are received, and wherein the communication apparatus is designed to use the direction to validate the position indication by means of the validation means. The communication apparatus according to the invention is characterized in that the direction determination means are designed to determine the direction from a phase difference in the communication signal on the two antennas.

The receive module and the transmit module can in each case both simultaneously access both antennas, for example by means of a circulator. The data-reading means, the direction determination means and the validation means can be designed as a separate or as a combined electronic arithmetic unit which runs software algorithms to read the data, to determine the direction and to validate the position indication and, where appropriate, the further data content.

Since the communication apparatus according to the invention thus comprises all means necessary for carrying out the method according to the invention, this offers the advantages already described above.

It is preferably provided that the at least two antennas are spaced by less than the half wavelength of the communication signal. This offers the advantage that ambiguities in the determination of the direction from the receive module to the transmit module are avoided.

It is furthermore provided that the communication apparatus carries out the method according to the invention. In addition to the means already mentioned, distance determination means, subdivision means and Doppler frequency determination means which can similarly be designed, for example, as electronic arithmetic units, can be provided for this purpose.

Finally, an aspect of the invention relates to a use of the communication apparatus according to the invention for vehicle-to-X communication in a vehicle.

BRIEF DESCRIPTION OF THE DRAWINGS

Further preferred embodiments can be found in the subclaims and in the following description of one example embodiment with reference to figures, wherein:

DETAILED DESCRIPTION OF THE PREFERRED EMBODIMENTS

Figure 1:
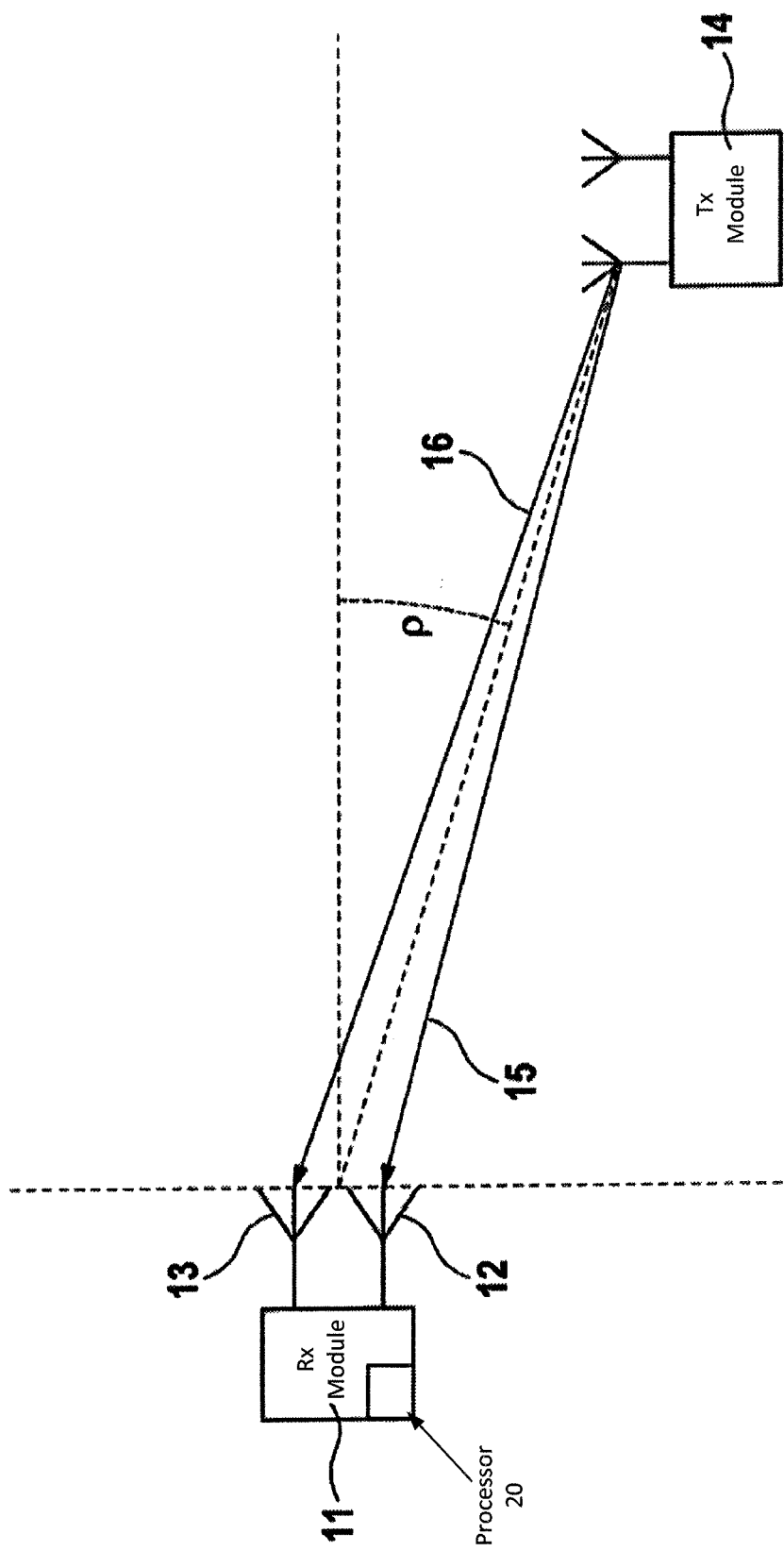
FIG. 1 shows a receive module of a communication apparatus which determines the direction to a transmit module.

FIG. 1 shows schematically a receive module 11 of a communication apparatus (not shown) in a motor vehicle (similarly not shown). The receive module 11 comprises two antennas 12 and 13 and a processor 20 by means of which the receive module 11 receives and processes communication signals from a transmit module 14. The communication signals are shown as arrows 15 and 16 and illustrate the different angles at which the communication signals transmitted by the transmit module 14 arrive on antennas 12 and 13 or are acquired by said antennas. The transmit module 14 is also assigned to a communication apparatus (not shown) in a motor vehicle (not shown). The spacing of the antennas 12 and 13 is less than the half wavelength of the communication signals transmitted by the transmit module 14. As can be seen, the communication signals transmitted by the transmit module 14 in each case travel over a different distance before they are acquired by the antenna 12 or 13. Since the communication signals are thus acquired by the antennas 12 and 13 with different phases, the angle ρ indicating the direction from the receive module to the transmit module can be determined from the phase difference. However, the interferometer method shown in FIG. 1 is unambiguous through 180° only, since the transmit module 14 can also be located on the left side of the receive module 11 at the angle ρ (instead of on the right side, as shown here). However, this is adequate for validating a position indication comprised by the communication signals.

Figure 2:
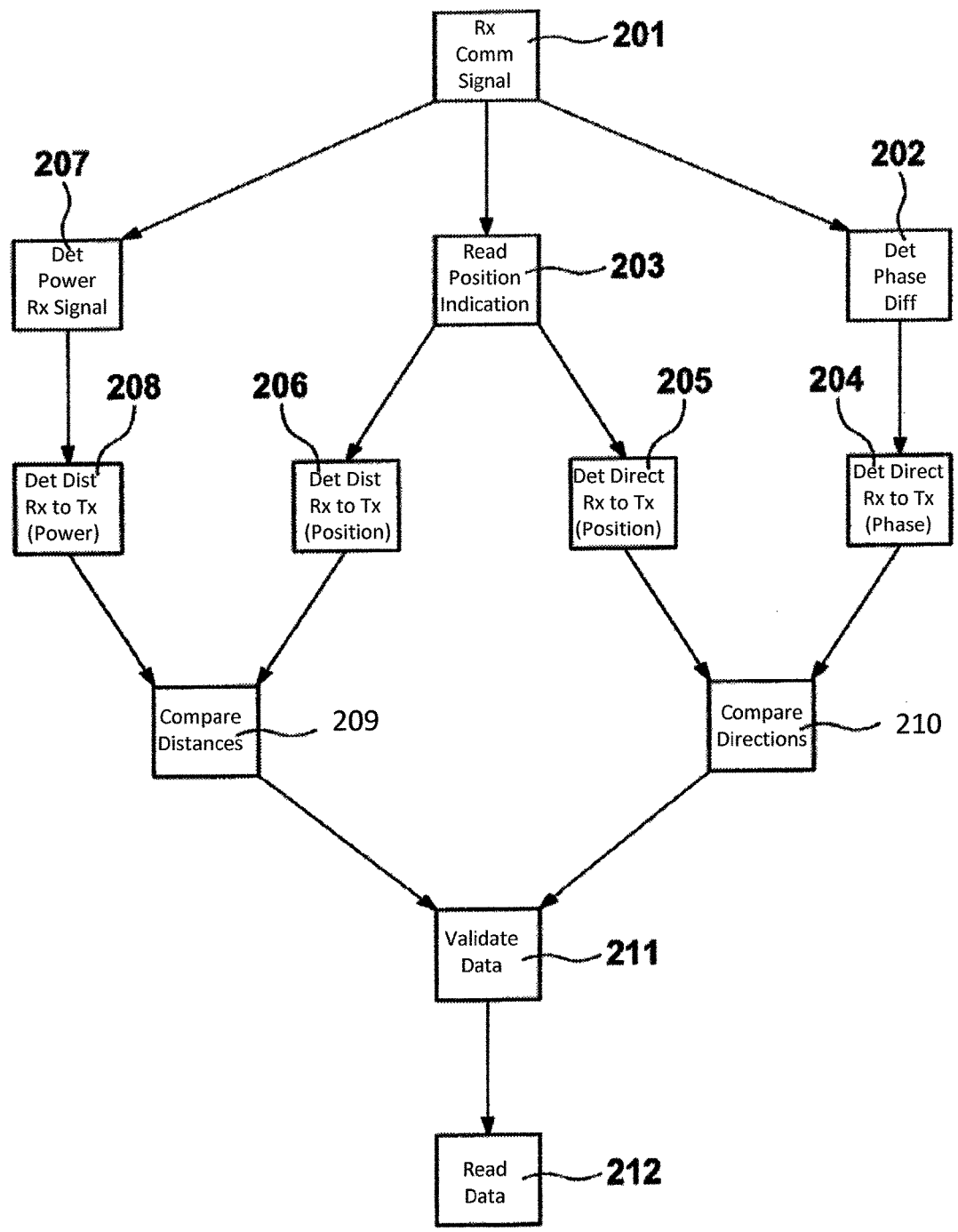
FIG. 2 shows a possible sequence of the method according to the invention in the form of a flow diagram.

FIG. 2 shows a possible sequence of the method according to an aspect of the invention in the form of a flow diagram. In method step 201, a communication signal, the data content of which comprises a position indication of the transmit module transmitting the communication signal, is received by a receive module by means of two antennas. In step 202, a phase difference in the communication signal on the two antennas is determined. Simultaneously, in step 203, the position indication in the data content of the communication signal is read and, in step 207, a received power of the communication signal on one of the two antennas is determined. In method step 204, the direction from the receive module to the transmit module is determined according to the interferometer method from the determined phase difference. In step 205, the direction from the receive module to the transmit module is similarly determined from the position indication in the data content of the communication signal and, in step 206, a distance from the receive module to the transmit module is determined from the position indication in the data content of the communication signal. In step 208, a distance from the receive module to the transmit module is then determined from the received power of the communication signal determined on one of the two antennas. It is assumed here that the communication signal is not weakened by visibility obstacles or other shadowing on the path from the transmit module to the receive module. If this is nevertheless the case, the distance determined in this way is greater than the actual distance. The determined distance thus describes a maximum distance which is precisely still plausible. In step 209, the distance determined from the received power is compared with the distance determined from the position indication. Since the distance determined from the position indication is only half as great as the distance determined from the received power, no conflict occurs in this case. In step 210, the direction determined from the phase difference is compared with the direction determined from the position indication. Since no conflict occurs in this case either, the entire data content of the communication signal is validated in step 211 and is thus regarded as trustworthy. In step 212, the entire data content of the communication signal is therefore read and processed by different vehicle systems.

The invention claimed is:

1. A method for validating a data content in a wirelessly received communication signal, wherein the data content comprises at least one position indication of a transmitter transmitting the communication signal, the method comprising:
   receiving, by a receiver having a processor and at least two antennas, the communication signal,
   determining, by the processor, a distance from the receiver to the transmitter from the position indication in the communication signal,
   determining, by the processor, a first direction from the receiver to the transmitter from the position indication in the communication signal,
   determining, by the processor, a second direction from the receiver to the transmitter based on the communication signal from a phase difference in the communication signal on the at least two antennas,
   validating, by the processor, the determined first direction from the position indication in the communication signal based on the determined second direction from the phase difference in the communication signal,
   validating the data content if the determined first direction from the position indication in the communication signal does not conflict with the determined second direction, and
   processing, by at least one vehicle system, the data content if no conflict has been recognized in the course of the validation.

2. The method as claimed in claim 1, wherein the communication signal is acquired temporally in parallel by the receiver by the at least two antennas.

3. The method as claimed in claim 1, wherein a first distance from the receiver to the transmitter is determined based on an acquired received power of the communication signal on at least one of the at least two antennas and the first distance is used to validate the position indication.

4. The method as claimed in claim 1, wherein a Doppler frequency of the communication signal is determined.

5. The method as claimed in claim 4, wherein the transmitters are subdivided into mobile transmitters and stationary transmitters based on the Doppler frequency.

6. The method as claimed in claim 5, wherein the data content furthermore comprises a speed indication of the transmitter transmitting the communication signal, wherein a subdivision of the transmitters is used to validate the speed indication.

7. The method as claimed in claim 1, wherein communication signals are transmitted and/or received temporally in parallel on at least two frequencies by at least one of the at least two antennas.

8. The method as claimed in claim 7, wherein a second distance from the receiver to the transmitter is determined from a phase difference in the communication signals on the at least two frequencies on the at least one of the at least two antennas.

9. A method for validating a data content in a wirelessly-received communication signal, wherein the data content comprises at least one position indication of a transmitter transmitting the communication signal, the method comprising:
   receiving, by a receiver having a processor and at least two antennas, the communication signal,
   determining, by the processor, a distance from the receiver to the transmitter from the position indication in the communication signal,
   determining, by the processor, a first direction from the receiver to the transmitter from the position indication in the communication signal,
   determining, by the processor, a second direction from the receiver to the transmitter based on the communication signal from a phase difference in the communication signal on the at least two antennas,
   validating, by the processor, the determined first direction from the position indication in the communication signal based on the determined second direction from the phase difference in the communication signal, and
   processing, by at least one vehicle system, the data content if no conflict has been recognized in the course of the validation,
   wherein the entire data content is validated if the data content does not conflict with at least one of the determined direction the determined first distance, the determined second distance, and subdivision.

10. The method as claimed in claim 1, wherein the transmitter and the receiver are assigned to different road users.

11. A communication apparatus for validating a data content in a wirelessly received communication signal, comprising:
   a transmitter,
   a receiver for receiving the communication signal,
   at least two antennas selectively coupled to the transmitter and the receiver,
   the receiver comprising at least one processor for:
      determining a distance from the receiver to the transmitter from the position indication in the communication signal,
      determining a first direction from the receiver to the transmitter from the position indication in the communication signal, determining a second direction from the receiver to the transmitter based on the communication signal from a phase difference in the communication signal on the at least two antennas, validating the determined first direction from position indication in the communication signal based on the determined second direction from the phase difference in the communication signal, validating the data content if the determined first direction from the position indication in the communication signal does not conflict with the determined second direction, and processing the data content if no conflict has been recognized in the course of the validation.

12. The communication apparatus as claimed in claim 11, wherein the at least two antennas are spaced by less than a half wavelength of the communication signal.

13. The use of the communication apparatus as claimed in claim 11 for vehicle-to-X communication in a vehicle.

14. The method as claimed in claim 2, wherein a first distance from the receiver to the transmitter is determined based on an acquired received power of the communication signal on at least one of the at least two antennas and the first distance is used to validate the position indication.

15. The communication apparatus as claimed in claim 11, wherein the processor is an electronic arithmetic unit.

* * * * *